United States Patent [19]

Muroi et al.

[11] Patent Number: 4,833,713
[45] Date of Patent: May 23, 1989

[54] VOICE RECOGNITION SYSTEM

[75] Inventors: Tetsuya Muroi, Yokohama; Seigou Yasuda, Yokosuka; Toshiki Kawamoto; Junichiroh Fujimoto, both of Yokohama, all of Japan

[73] Assignee: Ricoh Company, Ltd., Tokyo, Japan

[21] Appl. No.: 903,524

[22] Filed: Sep. 4, 1986

[30] Foreign Application Priority Data

| Sep. 6, 1985 | [JP] | Japan | 60-197254 |
| Sep. 6, 1985 | [JP] | Japan | 60-197255 |
| Mar. 19, 1986 | [JP] | Japan | 61-61726 |
| Apr. 17, 1986 | [JP] | Japan | 61-89138 |

[51] Int. Cl.$^4$ .................................................. G10L 5/06
[52] U.S. Cl. ........................................ 381/43; 381/41; 381/42; 381/45; 364/513.5
[58] Field of Search ........................ 381/40–45, 381/37, 39, 46, 47; 364/513.5, 513

[56] References Cited

U.S. PATENT DOCUMENTS 4,087,630  5/1978  Browning et al. ............... 364/513.5
4,144,582  3/1979  Hyatt ................................... 381/44

Primary Examiner—William M. Shoop, Jr.
Assistant Examiner—Brian Young
Attorney, Agent, or Firm—Mason, Fenwick & Lawrence

[57] ABSTRACT

A voice or sound recognition system including a microphone for converting a voice into an electrical voice signal, a frequency analyzer for generating a voice pattern in the form of a time-frequency distribution, and a matching unit for matching the voice pattern with registered voice patterns. A voice pattern sometimes contains a bass bar section starting from the beginning of the voice pattern over a time period. In one form of the present invention, the bass bar section is detected and/or eliminated before processing the voice pattern for the purpose of registration or matching. The voice level is sometimes too strong or too weak for appropriate processing. In another form of the present invention, a voice recognition system including a voice input cancelling function is provided. In addition, a system for detecting a voice interval for use in voice data processing, including a device for determining a start point of the voice interval is provided.

40 Claims, 1 Drawing Sheet

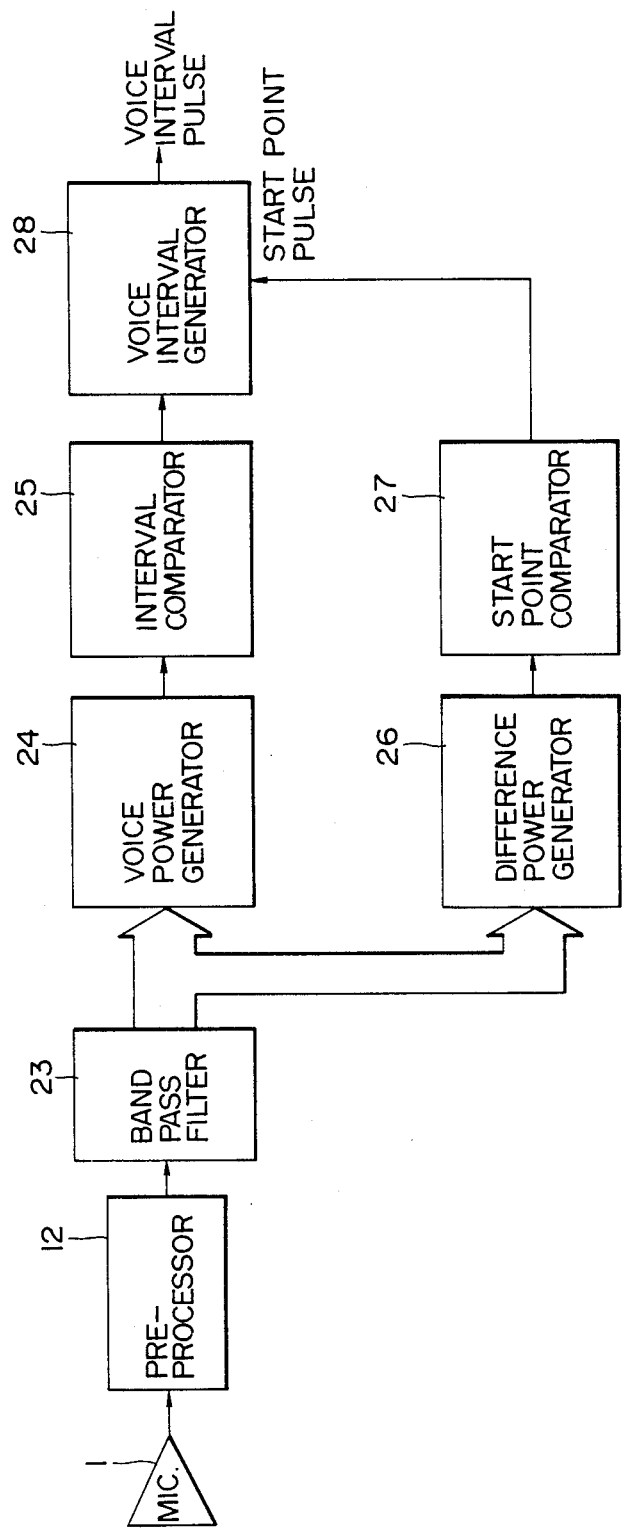

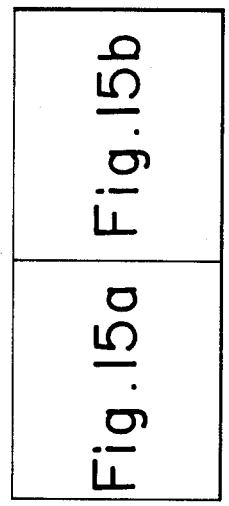
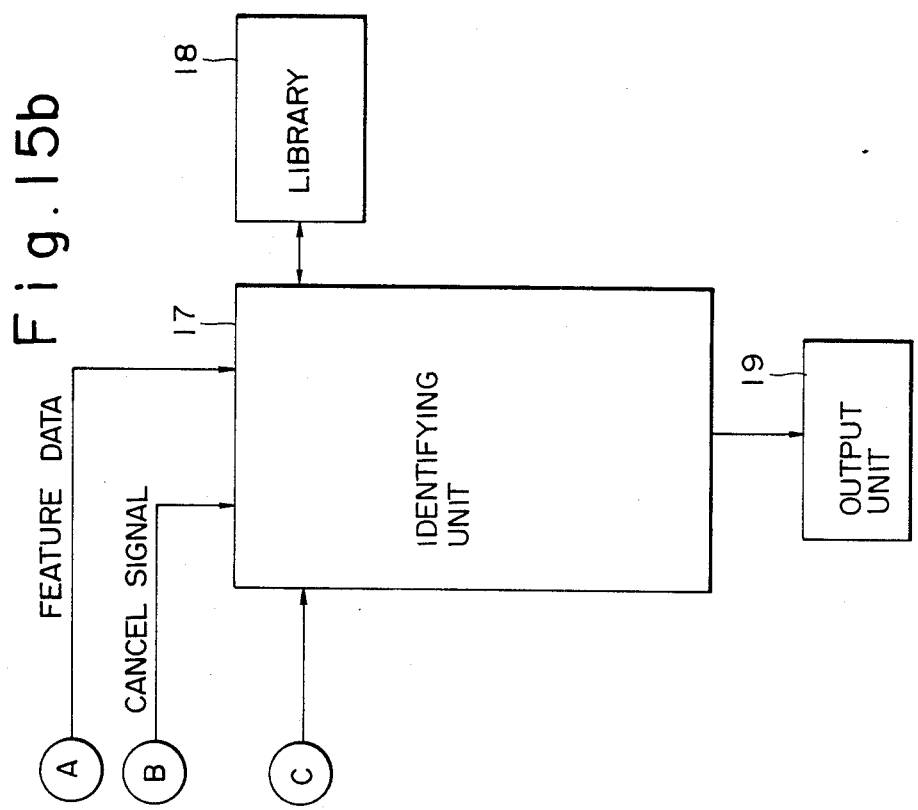

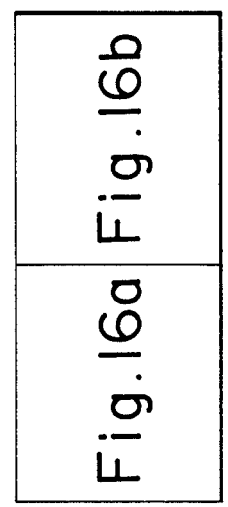
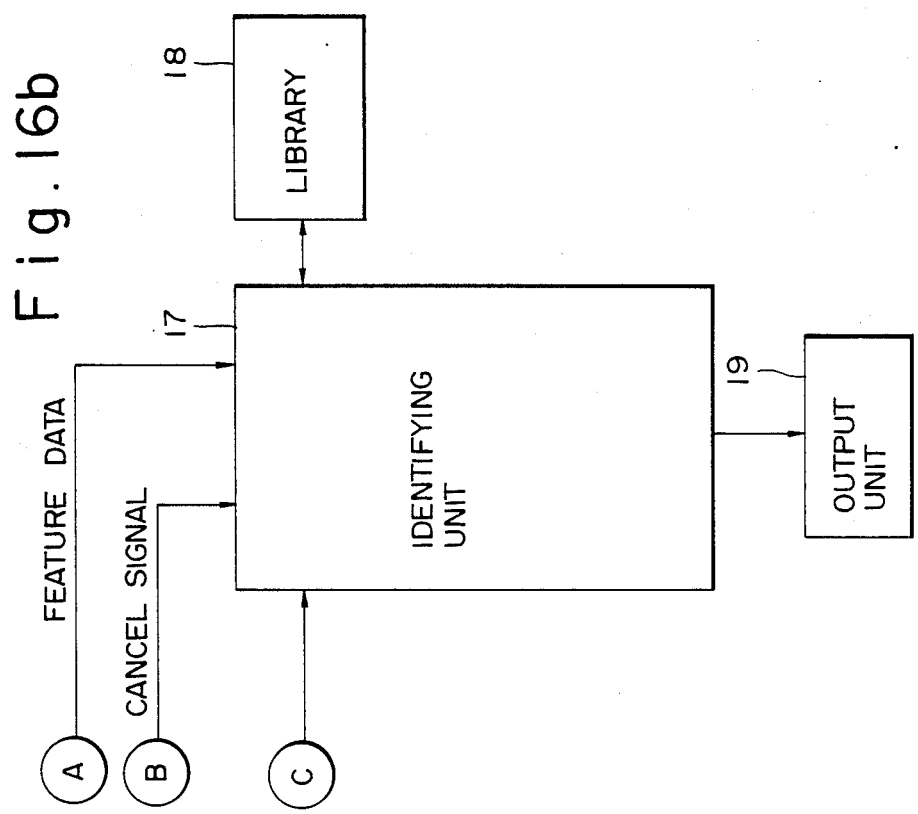

VOICE RECOGNITION SYSTEM

BACKGROUND OF THE INVENTION

1. Field of the Invention

This invention relates to a system for processing voice information, and, in particular, to a system for registering and/or recognizing voice information.

2. Description of the Prior Art

In voice recognition technology, it is known to produce a plurality of voice patterns by repeating the same sound or word and then to superpose the voice patterns to define a consolidated voice pattern for registration in a voice library. When producing a plurality of voice patterns, the same person can repeat the same sound or word over a predetermined number of times or two or more different persons can produce such voice patters. The reason for superposing a plurality of voice patterns to define a consolidated voice pattern for registration is that such a consolidated voice pattern allows to identify an unknown voice data with an enhanced chance of success because there are usually some differences between voice patterns even if the same person pronounces the same sound or word in succession.

In superposing a plurality of voice patterns for the same sound or word in accordance with the prior art technique, a voice interval for voiced sound is first determined and the superposition is carried our right from the beginning of the voice interval. In this case, if the beginning portion of a voiced word includes a voiced explosive sound or a mono-syllable includes a voiced explosive sound, then it is likely that the explosive sounds of two or more voice patterns do not overly on top of another due, for example, to presence and absence of a bazz bar section and/or differences in time period of such bazz bar section, thereby making it difficult to define a precise consolidated voice pattern for registration. In addition, in a process of recognizing unknown voice information, in accordance with the prior art technique, a voice pattern is produced from the unknown voice information and a voice interval is determined, and, then, matching with registered voice patterns is carried out to identify the unknown voice information. In this case, in accordance with the prior art, the voice pattern of unknown voice information is compared with the registered voice patterns right from the beginning of the voice interval. As mentioned above, this is advantageous because the presence or absence of a bass bar section could lead to a faulty voice recognition.

In addition, it is also well known to reject input voice information if its voice interval is too short because this could present difficulty in carrying out voice recognition processing. If an unknown voice data to be identified is too low in sound level, difficulty is often encountered in identifying the unknown voice data. Thus, it is often desired to reject processing of such an unknown voice data whose sound level is too low.

SUMMARY OF THE INVENTION

It is therefore a primary object of the present invention to obviate the disadvantages of the prior art as described above and to provide an improved voice recognizing system.

Another object o the present invention is to provide an improved system for registering a voice pattern by superposing a multiple of voice patterns for the same sound one on top of another.

A further object of the present invention is to provide an improved system for recognizing an unknown voice data.

A still further object of the present invention is to provide a voice recognizing system having an enhanced rate of recognition.

A still further object of the present invention is to provide a voice data input cancelling system for cancelling voice data to be identified if the voice data does not have an adequate sound level.

A still further object of the present invention is to provide a system for determining a voice interval at high accuracy for use in voice recognition.

Other objects, advantages and novel features of the present invention will become apparent from the following detailed description of the invention when considered in conjunction with the accompanying drawings.

BRIEF DESCRIPTION OF THE DRAWINGS

FIG. 8 is a block diagram showing a system for detecting a voice interval using difference power spectrum for use in voice recognition constructed in accordance with a still further embodiment of the present invention;

FIG. 15 is an illustration showing how FIGS. 15a and 15b should be combined;

FIGS. 15a and 15b are block diagrams showing, when combined as illustrated in FIG. 15, a voice recognizing system constructed in accordance with a still further embodiment of the present invention;

FIG. 16 is an illustration showing how FIGS. 16a and 16b should be combined;

FIGS. 16a and 16b are block diagrams showing, when combined as illustrated in FIG. 16, a voice recognizing system constructed in accordance with a still further embodiment of the present invention;

DESCRIPTION OF THE PREFERRED EMBODIMENTS

Figure 1:
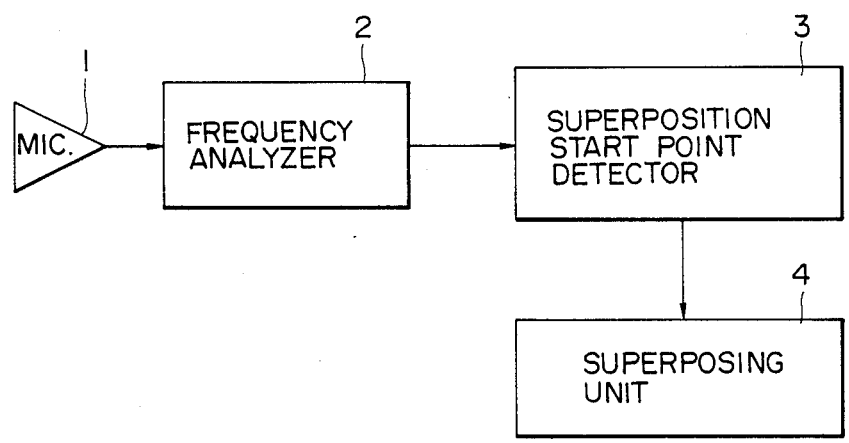
FIG. 1 is a block diagram showing a system for registering voice patterns constructed in accordance with one embodiment of the present invention.

Referring now to FIG. 1, there is shown in block form a system for registering a voice pattern for use in voice recognition, and it includes a microphone 1 for converting a sound in the form of pressure wave into an electrical sound signal, a frequency analyzer 2 for processing the electrical sound signal to produce a voice pattern in the form of a time-frequency distribution, a superposing start point detector 3 and a superposing unit 4. In this system, the same sound is applied to the microphone 1 a multiple of times by the same person or different persons and thus a plurality of voice patterns are produced in sequence. And, the plurality of voice patterns are superposed one after another, thereby registering a consolidated voice pattern for a particular sound. The voice pattern thus registered can later be used for identifying an unknown voice by matching as well known in the art.

In accordance with the present invention, a voice signal is subjected to frequency analysis to obtain a voice pattern in the form of a time-frequency distribution, and a start point of this voice pattern for superposing on a previously produced voice pattern for the same sound is detected by the superposition start point detector 3. And, this superposition start point is determined at the beginning portion of the voice pattern such that voice energy is equal to or less than a predetermined value and a low frequency component is equal to or more than a predetermined ratio of the voice energy. When this superposition start point is found, the superposition with the previous voice pattern for the same sound is initiated using this start point. Since the voice pattern is superposed on the previously registered voice pattern for the same sound, there is always left a single, consolidated voice pattern registered for a particular sound. As an alternative method, that portion of the voice pattern from the beginning to the superposition start point thus detected can be cut off or removed from the voice pattern, and, then, superposition can be carried out.

Figure 2:
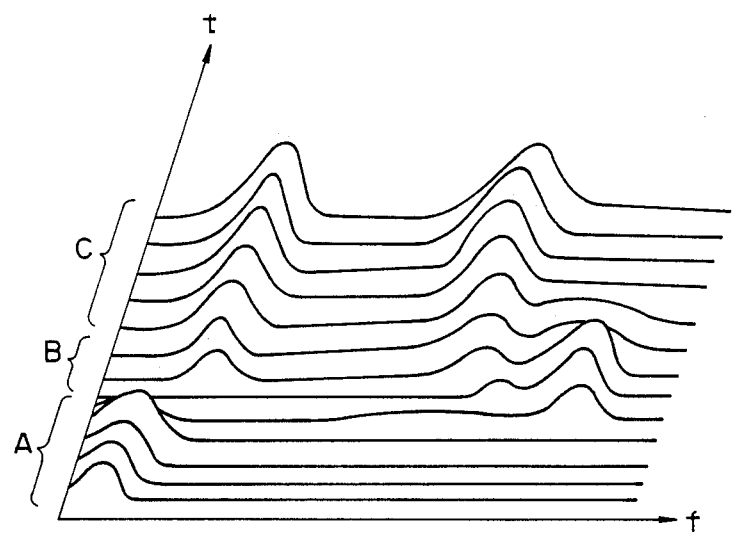
FIG. 2 is an illustration showing an example of a time-frequency spectral pattern for a voiced explosive sound.

FIG. 2 is an illustration showing in perspective a time-frequency spectral distribution pattern of sound "gi" as a voiced explosive sound. As shown, the pattern includes a bass bar section A, an explosive section B and a vowel section C. The bass bar section A is characteristic of a voiced explosive sound and it differs from person to person and from time to time even for the same person and it sometimes appears and sometimes does not appear even for the same person. Even if the bass bar section A does appear, its duration is unpredictable and extremely unstable. Besides, no appreciable difference is seen in the bass bar section B regarding the shape of a spectral pattern among three kinds of voiced explosive sounds "b", "d" and "g." Because of this, if two or more voice patterns for the same sound are superposed simply from the beginning of voice interval of each of the patterns, the explosive section B, which is a critical element in identifying a voiced explosive sound, may come to be superposed on the bass bar section A or the vowel section C, thereby hindering to define a superposed voice pattern to be registered at high accuracy.

Figure 3A:
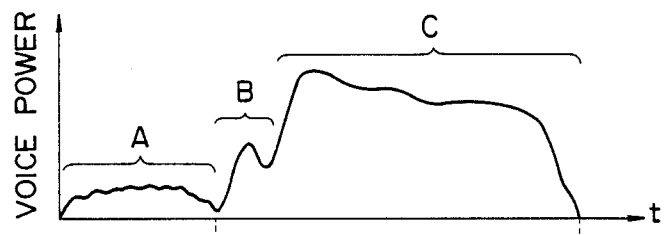
FIGS. 3a and 3b are graphs showing a time-dependent variation of voice power of a voiced explosive sound with and without a bass bar section A.
Figure 3B:
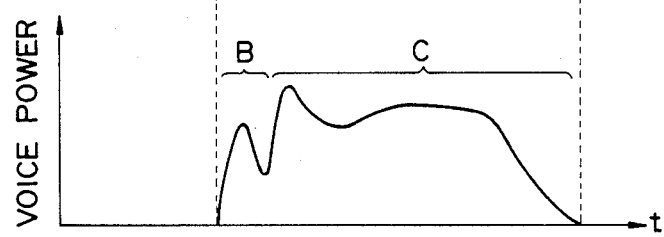

The principle of the present invention for superposing two or more voice patterns for a particular sound to be registered will be described with reference to FIGS. 3a and 3b. FIG. 3a shows a variation of voice power of a particular voiced explosive sound having a bass bar section A at the beginning as a function of time. FIG. 3b shows a variation of voice power of a particular voiced explosive sound having no bass bar section. As shown in FIG. 3a, the bass bar section A can be identified if two conditions are met. That is, at the beginning of a voice pattern as shown in FIG. 3a in terms of time-dependent voice power, there is a time period during which (1) the sound energy is equal to or less than a predetermined value and (2) a low frequency component has a ratio equal to or larger than a predetermined value of the sound energy. In accordance with the principle of the present invention, upon completion of such a time period from the beginning of a voice pattern, i.e., upon completion of the bass bar section A, superposition of voice patterns is carried out. As a result, it is always insured that the explosive sections B, which are critical in identifying a voiced explosive sound, are superposed accurately, thereby permitting to register a superposed voice pattern at high accuracy.

Described more in detail with reference to a more specific example, the frequency analyzer 2 includes a band-pass filter bank provided with 29 channels whose center frequency varies from 250 Hz to 6,30 Hz with an increment of 1/6 octave. Thus, when a voice signal from the microphone for a particular sound is processed through the frequency analyzer, there is obtained a time frequency distribution pattern at each time interval. The data obtained during each time interval will be called a frame and thus the data can also be identified by a frame number from the beginning of the pattern. A voice pattern is sequentially created by the frequency analyzer 2 and it is supplied into the superposition start point detector 3. At the superposition start point detector 3, the voice energy of a frame having a maximum voice energy during a voice interval is extracted and identified as Emax. Then, during a time period from the beginning of the voice interval up to 100–300 msec., preferably 200 msec., if there is an interval in which (1) the voice energy is equal to or less than 10–40%, preferably 20%, and (2) a low frequency component of 200 Hz–1 kHz, preferably 500 Hz, or less occupies 60–100%, preferably 80%, of the voice energy, the superposing operation is initiated upon completion of this interval.

Figure 17:
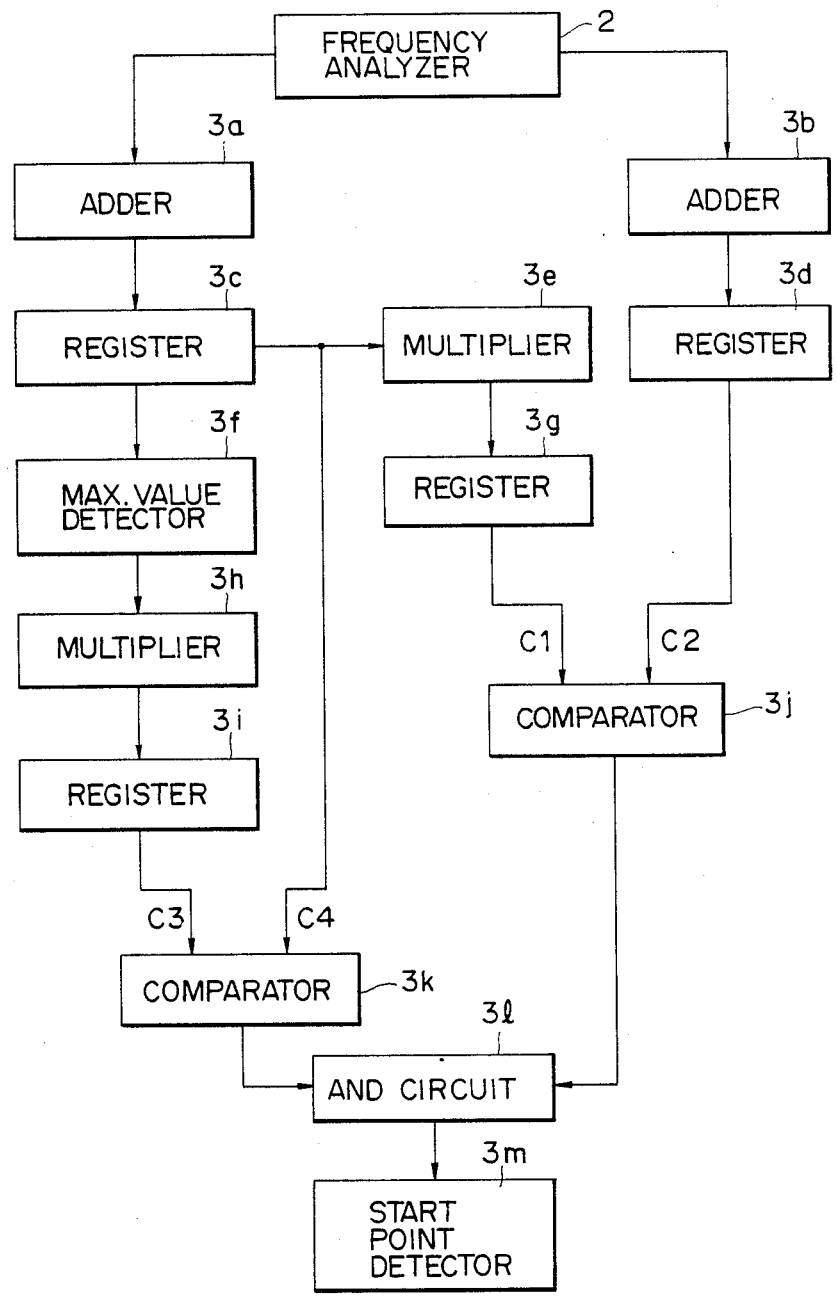
FIG. 17 is a block diagram showing the detailed structure of one example of the superposition start point detector 3 provided in the system shown in FIG. 1.

One example of the superposition start point detector 3 is shown in detail in FIG. 17. In the example shown in FIG. 17, the superposition start point detector 3 includes a pair of first and second adders 3a and 3b, respectively, connected to the frequency analyzer 2. The first adder 3a adds outputs from all of the channels 1 through 29 covering the frequency range from 250 Hz to 6,300 Hz of the band-pass filter bank provided in the frequency analyzer 2. On the other hand, the second adder 3b is provided to add outputs from channels 1 through 7 corresponding to a low frequency range from 250 Hz to 500 Hz. The added data obtained at the first adder 3a is temporarily stored in a first register 3c; whereas the data added at the second adder 3b is temporarily stored into a second register 3d. A first multiplier 3e is connected to receive the data stored in the first register 3c and a first predetermined factor, such as 0.8 (80%), is multiplied to the data from the first register 3c and the resulting data is temporarily stored into a third register 3g. The data in the second register 3d indicated by C2 is then compared with the data in the third register 3g indicated by C1 at a first comparator 3j which supplies as its output "1" if C1 is smaller than C2 and "0" if C1 is equal to or larger than C2.

Also connected to the first register 3c is a maximum value detector 3f which detects a maximum value of the added data for each time interval, or frame, and supplies this maximum value to a second multiplier 3h. At the multiplier, a second predetermined factor, such as 0.2 (20%), is multiplied to the maximum value supplied from the maximum value detector 3f and the resulting data is temporarily stored into a fourth register 3i. The data in the fourth register 3i indicated by C3 is then compared with the data in the first register 3c indicated by C4 by a second comparator 3k which supplies at its output "1" if C3 is larger than C4 and "0" if C3 is equal to or smaller than C4.

With this structure, if each of the first and second comparators 3j and 3k supplies "1" as an output to an AND circuit 31 and thus the AND circuit 31 supplies "1" as its output, it indicates that the bass bar section A of a voice pattern is being processed. When the AND circuit 31 supplies "0" as its output for the first time, it indicates the end of the bass bar section A, so that the corresponding frame is detected as a start point for superposition at a start point detector 3m and then supplied to the superposing unit 4.

Figure 18:
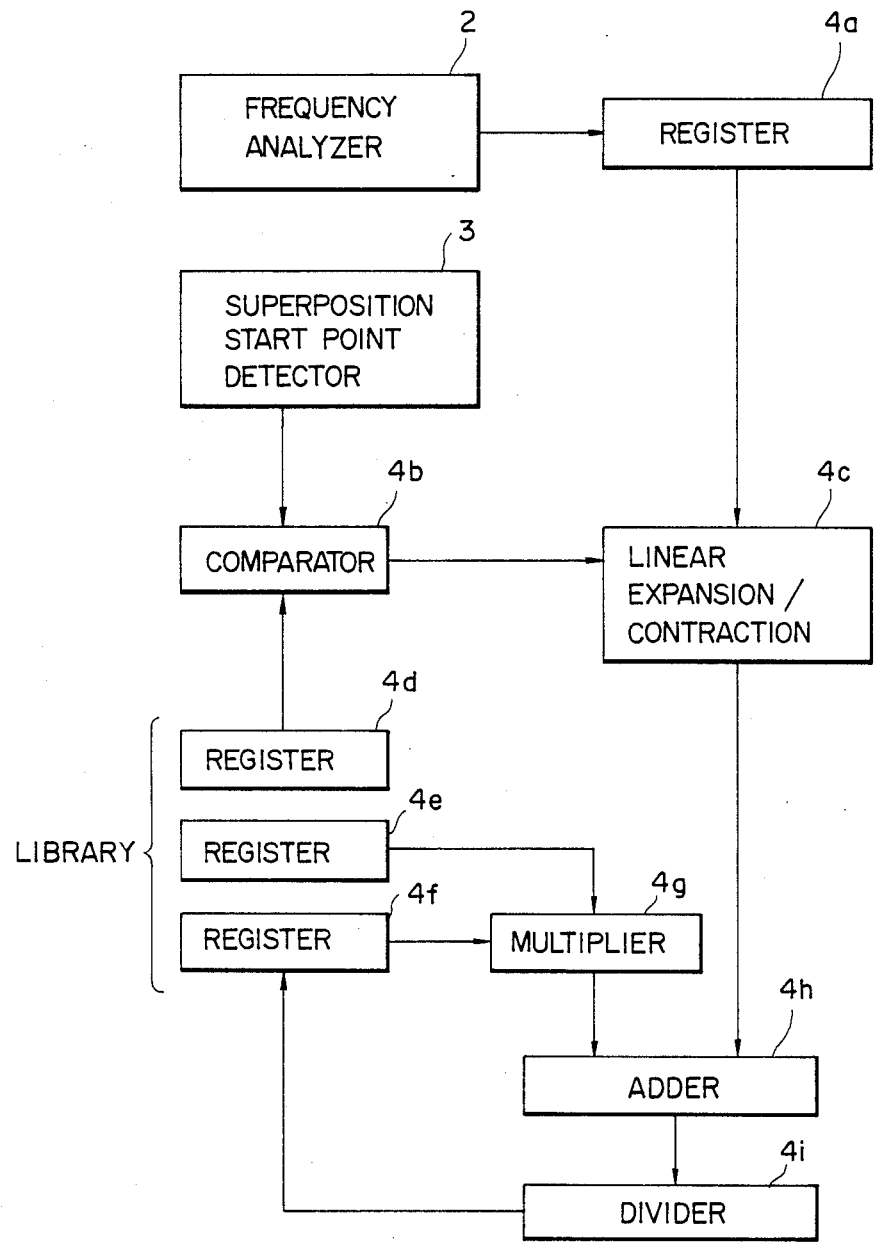
FIG. 18 is a block diagram showing the detailed structure of one example of the superposing unit 4 provided in the system shown in FIG. 1.

Furthermore, FIG. 18 shows in detail one example of the superposing unit 4 in the system shown in FIG. 1. As shown, the superposing unit 4 includes a register 4a for temporarily storing a voice pattern in the form of a time-frequency distribution which has just been created from an input sound. The illustrated superposing unit 4 also includes another register 4d which stores the number of frames of each of registered voice patterns. When the new voice pattern is stored into the register 4a, the number of frames to be superposed of the new voice pattern (i.e., the number of frames from the superposition start point to the end of the voice interval) is compared with the number of frames stored in the register 4d for the corresponding sound, and, then, the degree of linear expansion/contraction (i.e., the number of frames) to be carried out for the new voice pattern stored in the register 4a is determined. Then, the new voice pattern stored in the register 4a is subjected to linear expansion/contraction, thereby equalizing the number of frames of the new voice pattern to be superposed with the number of frames of the registered voice patter, which is stored in the register 4d as mentioned before.

Also provided is a further register 4e for storing the number of superpositions for each of the registered voice patterns and a still further register 4f for storing registered voice patterns. The value of the registered voice pattern stored in the register 4f is multiplied by the corresponding number of superpositions stored in the register 4e at a multiplier 4g, and, then, the resulting data is added to the new voice pattern subjected to linear expansion/contraction processing by an adder 4h.

And, then, the added result is divided by (number of superpositions +1) at a divider 4i and its result is stored into the register 4f as a renewed voice pattern. Described more in detail, assuming that Xij indicates a value of a registered voice pattern at ith channel and jth frame and Yij indicates a value of a newly input voice pattern for the same sound at ith channel and jth frame, then the value Xij' of a renewed voice pattern by superposition can be expressed in the following manner.

$$Xij' = \frac{mXji + Yij}{m + 1}$$

where, m: number of superpositions.

It is to be noted that the number of superpositions stored in the register 4e for the corresponding sound is renewed by incrementing +1 each time when superposition is carried out.

Figure 4:
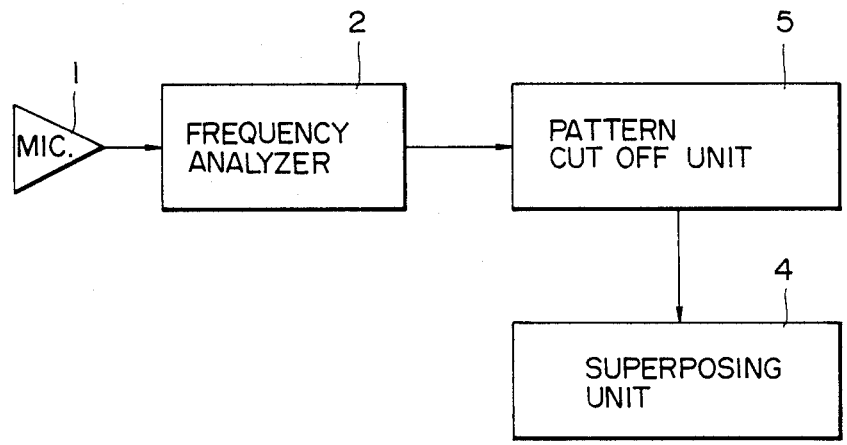
FIG. 4 is a block diagram showing a system for registering voice patterns constructed in accordance with another embodiment of the present invention.

FIG. 4 shows in block form another embodiment of the present invention which is a modification of the structure shown in FIG. 1. It is to be noted that as practiced throughout the present specification and the drawing like numerals indicate like elements unless specifically noted otherwise. In the present embodiment, use is made of a pattern cut off unit 5 in place of the superposition start point detector 3. In accordance with this embodiment, if a time interval is present at the beginning of a voice pattern such that the voice energy is equal to or less than a first predetermined value and a low frequency component is equal to or larger than a second predetermined value which is determined as a ratio of the voice energy. And, such a time interval is discared at the pattern cut off unit 5 before the voice pattern is superposed. As an illustrative example, the pattern cut off unit 5 may have a structure as shown in FIG. 17. In this case, however, the start point detector 3m should be replaced with a cut off end point detector which has a function of detecting a frame when the output from the AND circuit 31 has become "0" for the first time and then discard all of the previous frames up to the "0"-detected frame.

Thus, when a sound in the form of a pressure wave is input into the microphone 1, it is converted into an electrical voice signal which is then processed through the frequency analyzer 2 to produce a voice pattern. When the voice pattern is supplied to the pattern cut off unit 5, its voice energy and a ratio of the energy of a low frequency component to the voice energy, which is a sum of outputs of all of the band-pass filter bank (29 channels in the illustrated example), are detected. Then, it is checked as to whether there is such a time interval at the leading portion of the voice pattern that the voice energy is equal to or less than a first predetermined value and the energy of the low frequency component is equal to or larger than a second predetermined value. And, if it has been found that such a time interval exists, then it is discarded before the voice pattern is supplied to the superposing unit 4. Therefore, at the superposing unit 4, a plurality of voice patterns whose leading portions have been cut off are superposed to define a consolidated voice pattern to be registered.

Thus, in accordance with this embodiment, the bass bar section A shown in FIG. 3a is discarded by the pattern cut off unit 5 so that there is formed a voice pattern composed only of the explosive section B and the vowel section C. In this case, even if the voice pattern of a voiced explosive sound having a bass bar section is to be superposed on the voice pattern of a voiced explosive sound having no bass bar section, it is always insured that the explosive sections are placed on top of the other, thereby allowing registration of a superposed voice pattern at high accuracy. This holds equally true for the case of superposing two voice patterns each having the bass bar section A.

Figure 5:
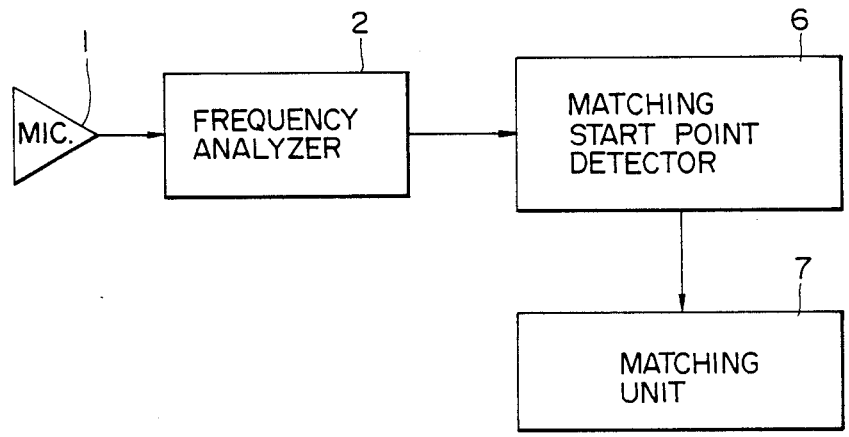
FIG. 5 is a block diagram showing a voice pattern identifying system constructed in accordance with a further embodiment of the present invention.

FIG. 5 shows in block form a voice recognition system embodying the present invention. The overall structure of this embodiment is similar in many respects to those embodiments shown in FIGS. 1 and 4. The present system includes the microphone 1 for converting an input sound in the form of a pressure wave into an electrical voice signal which is then processed through the frequency analyzer 2 to produce a voice pattern in the form of a time-frequency distribution. As described before, the frequency analyzer 2 preferably includes a band-pass filter bank of predetermined channels, with the output of each of the channels defining segmented voice energy for that particular channel. Thus, the sum of the segmented voice energies defines a voice energy at a particular time interval, which corresponds to a frame. The voice pattern is supplied to the matching start point detector 6 which may be structured as shown in FIG. 17, and the voice pattern is suitably processed to determine as to whether there is a time interval at the leading portion of the voice pattern which satisfies the conditions that (1) the voice energy is equal to or less than a first predetermined value and (2) the partial voice energy of a low frequency component is equal to or larger than a second predetermined value, which is a ratio between the partial voice energy of the low frequency component to the voice energy of the entire frequency component. If such a time interval is found to be present, then a signal is supplied to the matching unit 7 so as to carry out a matching operation with a library of registered voice patterns upon completion of such time interval.

When an unknown sound to be identified is input into a voice recognizing system, if a source of such a sound is located far away from the system and/or the sound is too low in level, its voice interval cannot be accurately determined. In such a case, a voice block small in voice power or energy of an input voice pattern may be lost, so that it could hinder making an accurate library and/or carrying out identification of the unknown sound. It is thus desired that if the level of an unknown sound is too low or too high, the unknown sound is rejected and thus prevented from being processed through a voice processing system, such as a voice registration and/or recognition system.

Figure 6:
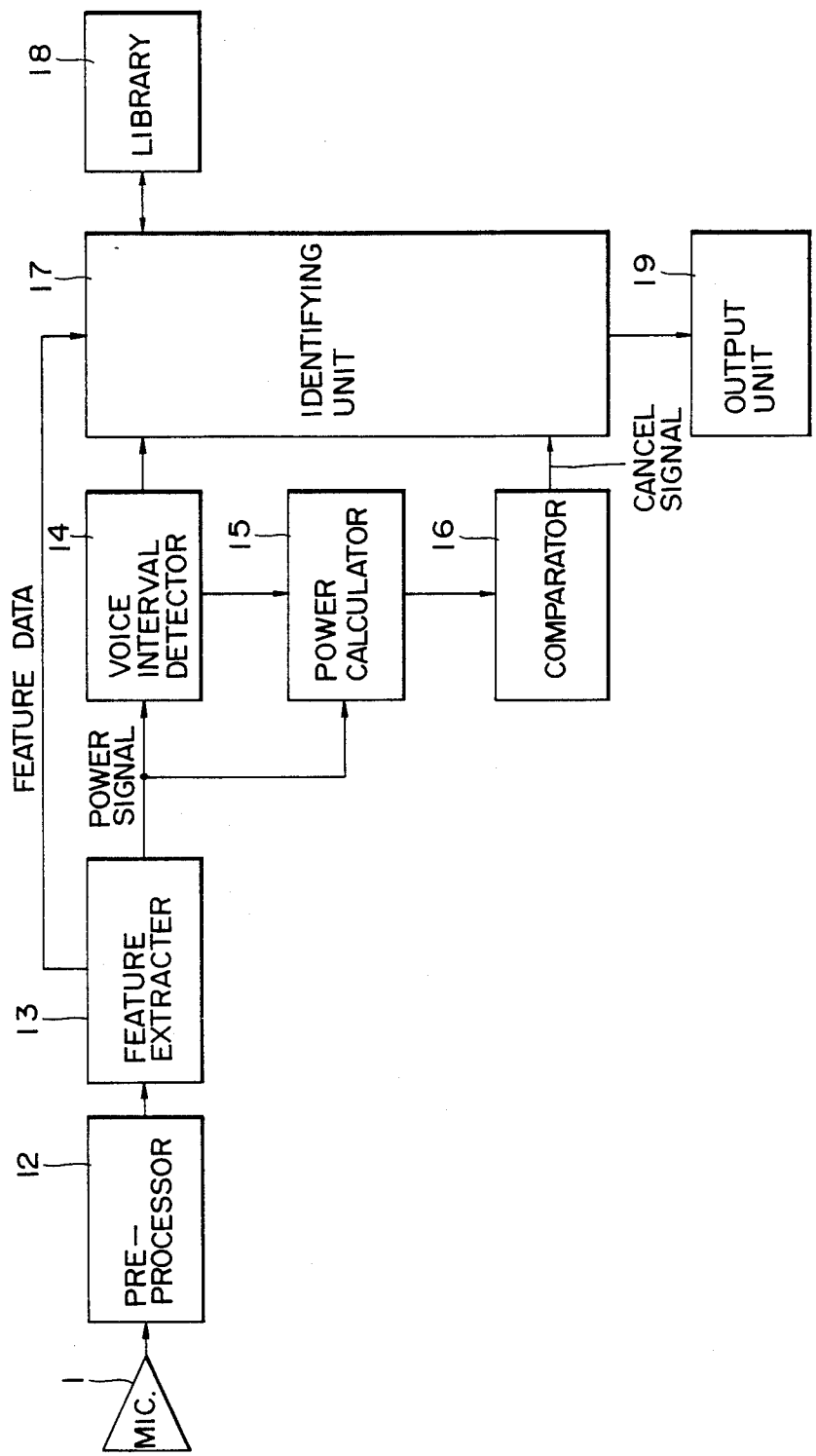
FIG. 6 is a block diagram showing a voice recognizing system provided with a voice data cancellation function constructed in accordance with a still further embodiment of the present invention.

FIG. 6 shows in block form one example of such a voice processing system provided with a voice pattern cancelling function. As shown, the illustrated voice processing system includes the microphone 1 for converting a sound in the form of a pressure wave into an electrical voice signal. Connected to the microphone 1 is a preprocessor 12 which processes the voice signal from the microphone 1 typically in the form of a small current in a predetermined manner. For example, the preprocessor has a function, such as amplification, frequency compensation, AGC, or preemphasis. The system also includes a feature extracter 13 for receiving a preprocessed voice signal for extracting predetermined features therefrom. As an example, the feature extracter 13 may include a frequency analyzer, comprised of a plurality of band-pass filters, and a binary code converter, so that the voice signal is converted into a voice pattern in the form of a time-frequency distribution.

The voice pattern (feature data) is then supplied to an identifying unit 17. On the other hand, the outputs from the respective band-pass filters are added and its sum is defined as a voice power or energy, which is supplied to a voice interval detector 14 as a power signal.

The power signal is then supplied to a power calculator 15 where the power signal is added in association with a voice interval signal supplied from the voice interval detector 14. The added result is then supplied to a comparator 16 where the added power value is compared with a reference value and a cancel signal for cancelling the further processing of the current voice pattern is supplied to the identifying unit 17 depending on the outcome of the comparison. If no such cancel signal is supplied to the identifying unit 17, the identifying unit 17 carries out a matching operation between the voice pattern (feature data) received from the feature extracter 13 and registered voice patterns in a library 18 and the voice pattern having the best similarity is supplied to an output unit 19.

Figure 7:
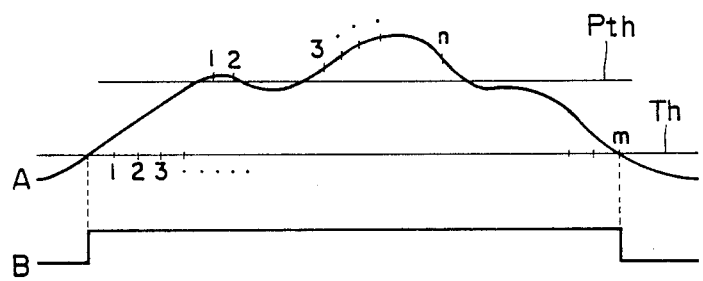
FIG. 7 is a wave diagram useful for explaining the operation of the system shown in FIG. 6.

Now, the operation of the structure shown in FIG. 6 will be described more in detail with particular reference to FIG. 7. In FIG. 7, a curve A is a voice power envelope and a curve B is a voice interval signal with Th and Pth indicating respective threshold levels. Now, when the input voice power signal A exceeds the voice interval threshold Th, the beginning of a voice interval is detected so that the voice interval signal B changes to high level. While the voice interval signal B is at high level, the feature data (voice pattern) is supplied to the identifying unit 17 at a predetermined time interval frame by frame, and, at the same time, the voice power signal supplied from the feature extracter 13 is monitored. When the voice power signal A exceeds a predetermined threshold Pth, the value of the voice power signal A is cumulatively added frame by frame over a predetermined number n of frames by the power calculator 15. The added value V(t) is then supplied to the comparator 16 where the added value V(t) is compared with a set of predetermined upper and lower limit references Lth and Hth, respectively. If the result of the comparison indicates that the added value V(t) is equal to or smaller than the lower limit Lth or equal to or larger than the upper limit Hth, then a cancel signal is supplied to the identifying unit 17, thereby cancelling the current voice pattern. Although not shown specifically, it may be preferably so structured that the issuance of such a cancel signal activates an indicator for indicating that the current voice pattern is cancelled and thus a new input of sound with appropriate sound level is required.

As an alternative structure, the voice power signal A is cumulatively added over the entire voice interval, i.e., while the voice interval signal is at high level, and, then, the added value is divided by the total number of frames over the entire voice signal to produce an average voice power. This average voice power is compared with a set of predetermined upper and lower limit reference values to determine whether the average voice power falls within a predetermined range or not.

In the case where the threshold value Pth is constant, if the level of background noise increases, the cancelling function could be undesirably affected by the background noise. In order to cope with such a situation, the threshold Pth and the upper and lower limit references Hth and Lth, respectively, are changed in a predetermined manner. As an example, these threshold values Pth, Lth and Hth may be varied depending on the background power level N(t) at the end of the previous sound as indicated below.

$$Pth = K_1(N(t)) + Pc$$

$$Lth = K_2(N(t)) + Lc$$

$$Hth = K_3(N(t)) + Hc$$

Here, Pc, Lc and Hc are constants.

Now, in speech or voice recognition, it is necessary to determine a voice interval of a sound or voice to be identified. In this case, the detection of the beginning or start point of a sound or voice to be identified is critical. In particular, when the sound to be identified begins with a consonant, it is important that its start point be accurately detected. One way of detecting the start point of a voice interval is to monitor the magnitude of a difference power spectrum. FIG. 8 shows in block form a system for detecting the beginning of a sound using difference power spectrum. As shown, the system includes the microphone 1, preprocessor 12, band-pass filter 23, voice power generator 24, interval generator 25, difference power generator 26, start point comparator 27, and voice interval generator 28. With this structure, a voice in the form of a pressure wave is input into the microphone 1 which supplies a converted electrical voice signal which in turn is processed through a plurality of band-pass filters (channels) 23 different in frequency range at a predetermined sampling cycle, so that each of the band-pass filters 23 supplies as its output channel voice power. Thus, if there are 29 channels, for example, there are produced 29 channel voice power outputs at each time interval. These channel (segmented) voice power outputs are supplied to the difference power generator 26 in parallel, where a difference is calculated between each of the channel voice power outputs and the corresponding one of the last preceding channel voice power outputs and these differences are added together to determine a difference power spectrum. Then, the resulting difference power spectrum is compared with and found to exceed a predetermined threshold value, it is decided to be the start point or beginning of the voice. Upon determination of the start point of the voice, the voice power is monitored and a voice interval is determined as a time period during which the voice power is equal to or above a predetermined voice power threshold.

Figure 9A:
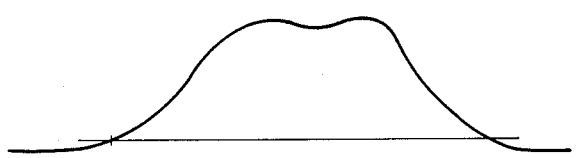
FIGS. 9a, 9b, 10a and 10b are wave diagrams useful for explaining the operation of the system shown in FIG. 8.
Figure 9B:
Figure 10A:
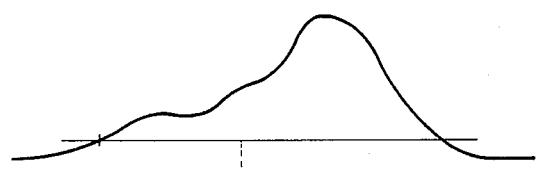
Figure 10B:
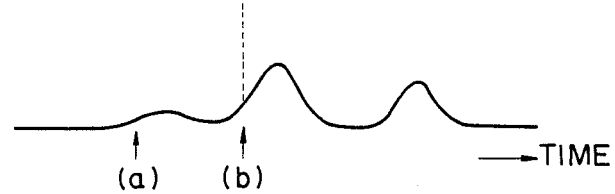

This aspect will be described in more detail with particular reference to FIGS. 9a, 9b, 10a and 10b. FIGS. 9a and 10a show two different voice power signals and FIGS. 9b and 10b show respective difference power signals. FIG. 9a is a voice power signal for a voice which starts with a vowel so that the difference power signal shown in FIG. 9b has a relatively sharp rising slope at the beginning On the other hand, FIG. 10a shows a voice power signal for a voice which starts with a consonant so that the difference power signal shown in FIG. 10b does not have a sharp rising slope at the beginning. In the case shown in FIG. 10b, if detection failed at point (a) in time, then the next detection will be effected at point (b) in time, in which case the consonant at the beginning would be lost as a whole. This trend is vivid for a voice starting with a consonant, such as "s", "p", "t", "m" or "n."

Figure 11:
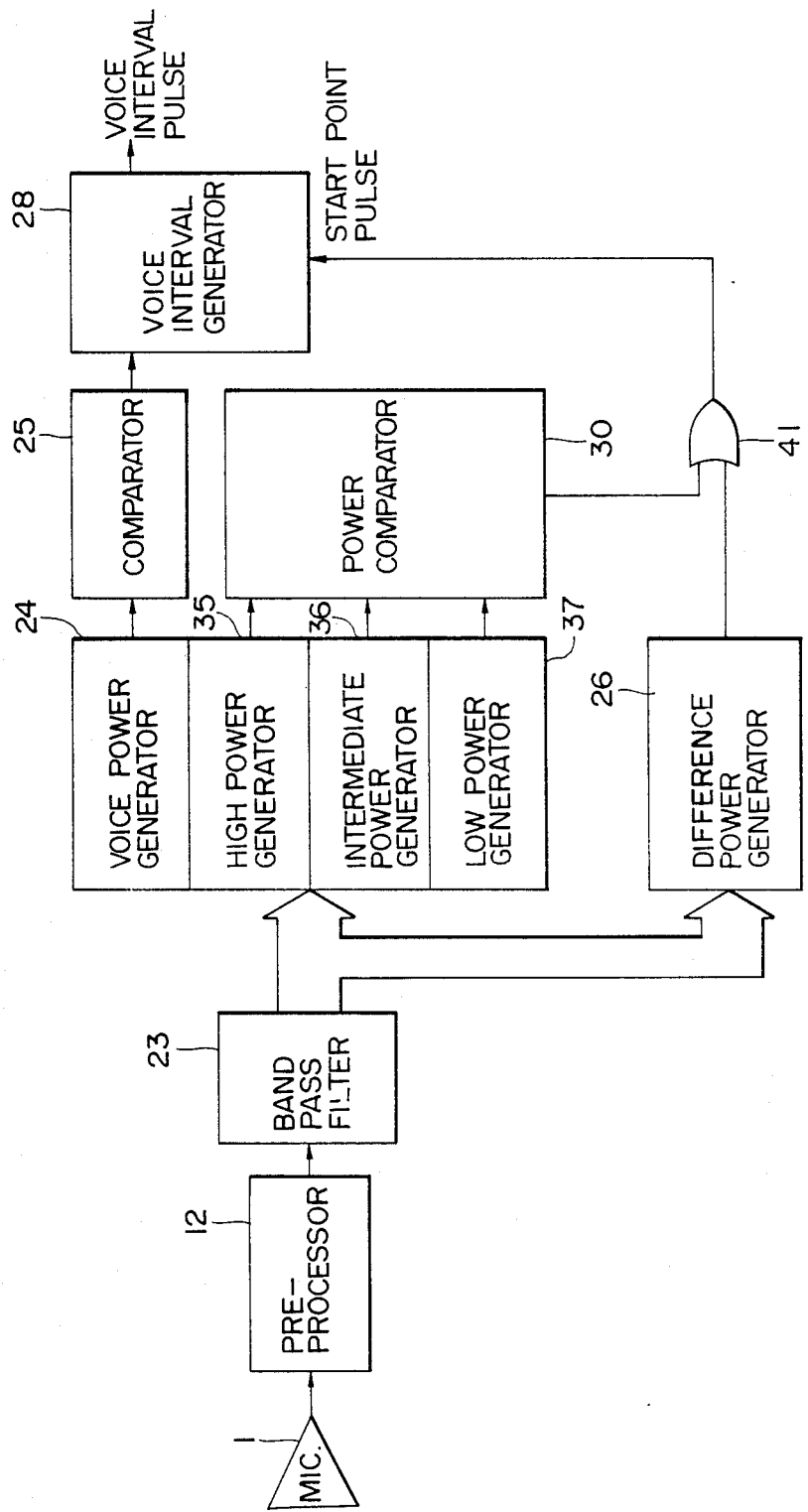
FIG. 11 is a block diagram showing a system for detecting a voice interval for use in voice recognition constructed in accordance with a still further embodiment of the present invention.

FIG. 11 shows in block form an improved system for detecting a voice interval, in particular the beginning of a sound, at high accuracy embodying the present invention. This system is designed to detect even a consonant block stably and it is structured based on the finding that consonants, such as "s", "p" and "t", have a concentration of voice power at a high frequency range; whereas, consonants, such as "M" and "N", have a concentration of voice power at a low frequency range. For this purpose, the outputs from a plurality of band-pass filters different in frequency range are divided into three regions: high, intermediate and low frequency regions. And, the voice power values of these three regions are compared from one another only for detection of the start point of a voice.

As shown in FIG. 11, the illustrated system includes the microphone 1, preprocessor 12, a plurality of band-pass filters 23, voice power generator 24, high frequency range voice power generator 35, intermediate frequency range voice power generator 36, low frequency range voice power generator 37, difference power generator 26, comparator 25, voice power comparator 30 and interval generator 28. It is to be noted that those elements identical to those shown in the previous embodiments are indicated by identical numerals unless stated otherwise. It is to be noted, however, that, as an example, the band-pass filter bank 23 includes a plurality of band-pass filters different in frequency range, each filter defining an individual channel, and the plurality of band-pass filters are divided into three categories: low, intermediate and high frequency regions. For example, if the band-pass filter bank 23 has 15 channels ranging from 250 Hz to 6.35 kHz with the center frequency of 1 kHz, the first three channels define the low frequency region and the last three channels define the high frequency region with the rest defining the intermediate frequency region.

Figure 12:
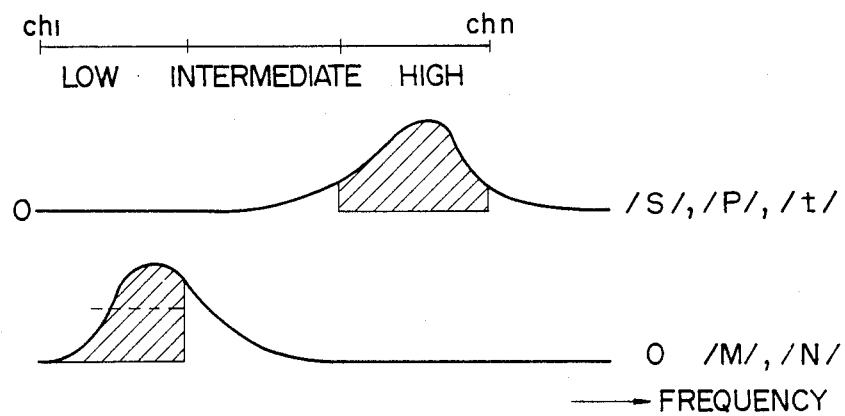
FIG. 12 is an illustration useful for explaining the operation of the system shown in FIG. 11.

With this structure, when the voice power of the high frequency region supplied from the generator 35 is detected to be higher than a predetermined threshold T-high and it is also detected to be larger than the voice power of the low frequency region supplied from the generator 37, the power comparator 30 determines that such a consonant as "s", "p" or "t" has started. This is the case of detection of a consonant having a concentration of voice power in the high frequency region. On the other hand, if the voice power of the low frequency region is detected to be higher than a predetermined threshold T-low and it is also detected to be larger than the voice power of the high frequency region, the power comparator 30 determines that such a consonant as "M" or "N" has started. This is the case of detection of a consonant having a concentration of voice power in the low frequency region. FIG. 12 illustrates the distribution of voice power for consonants "s", "p" and "t" and that for consonants "M" and "N."

As shown in FIG. 11, an OR gate 41 is also provided with its one input terminal connected to an output terminal of the power comparator 30, its other input terminal connected to an output terminal of the difference power generator 26 and its output terminal connected to the interval generator 28. With this structure, if the concentration of voice power in the low or high frequency region is not detected as described above, then the difference power spectrum is used to produce a start point pulse. Thus, the detection of the start point of a voice can be carried out by the present system for every possible voice or sound.

Figure 13:
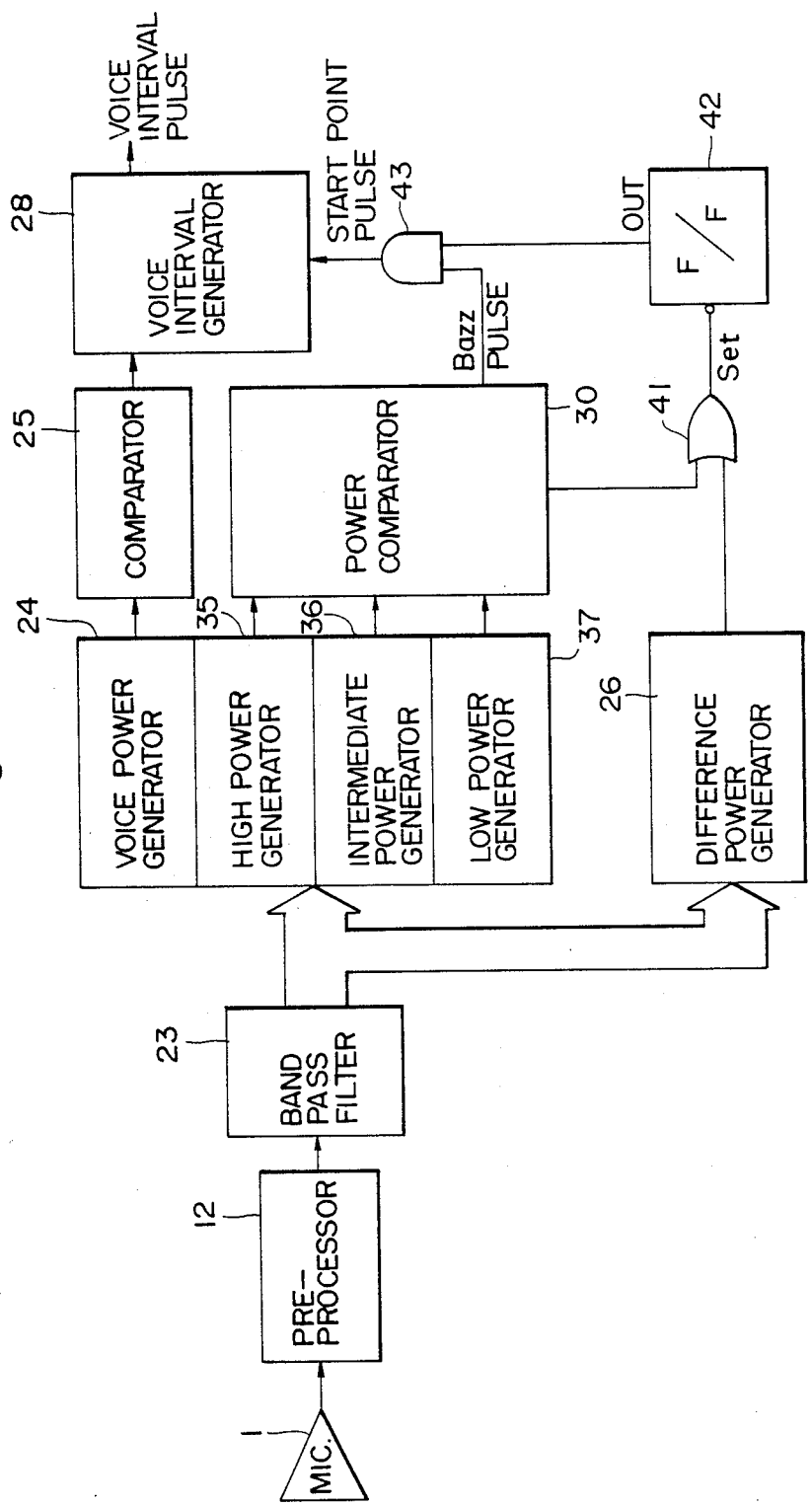
FIG. 13 is a block diagram showing a system for detecting a voice interval for use in voice recognition constructed by modifying the structure shown in FIG. 11.

FIG. 13 shows in block form a system for detecting the start point of a voice or sound, which is a modification of the structure shown in FIG. 11. This system is similar in many respects to the system shown in FIG. 11 with the exception of the provision of a flip-flop 42 and an AND gate 43 and of the power comparator 30 having an additional function of detection a bazz sound. The flip-flop 42 has its input terminal connected to the output terminal of the OR gate 41 and its output terminal connected to one input terminal of the AND gate 43 which has its other input terminal connected to another output terminal of the power comparator 30 and its output terminal connected to the interval generator 28.

Figure 14:
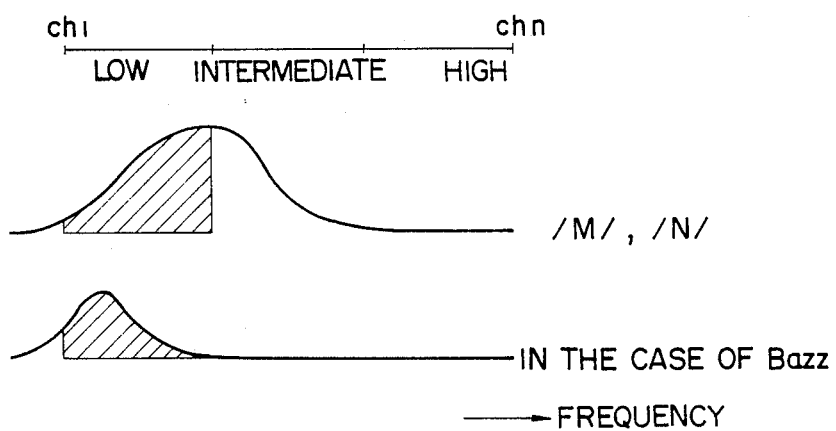
FIG. 14 is an illustration useful for explaining the operation of the system shown in FIG. 13.

In the case of detecting a voice interval with the system shown in FIG. 11 particularly for a voice which starts with such a consonant as "M" and "N" having a concentration in the low frequency region, there is a tendency to detect the bazz bar section which may be present immediately prior to a voiced sound. As a result, there is a chance that unnecessary information is added in detection of a voice interval. However, as shown in FIG. 14, the bass sound has such features as an enhanced concentration of voice power to a still lower frequency region and a lower voice power level. In accordance with the present embodiment, utilizing these features of the bass sound, the bass sound is prevented from entering into a detected voice interval. That is, even if the voice power of the low frequency region has been detected to be larger than the other two regions and this information is supplied to the flip-flop 42 from the power comparator 30 through the OR gate 41, the detection of the start point of a voice is not effected unless the voice power of the low frequency region is detected to be larger than a predetermined threshold T-bass. Thus, if the voice power of the low frequency region is smaller than T-bass, a Bass pulse at low level is supplied to the AND gate 43, and, thus, no voice interval pulse is generated. A voice interval pulse is generated only when the detection of the start point of a voice is present a the flip-flop 42 and the Bass pulse at high level is supplied to the AND gate 43.

Figure 15A:
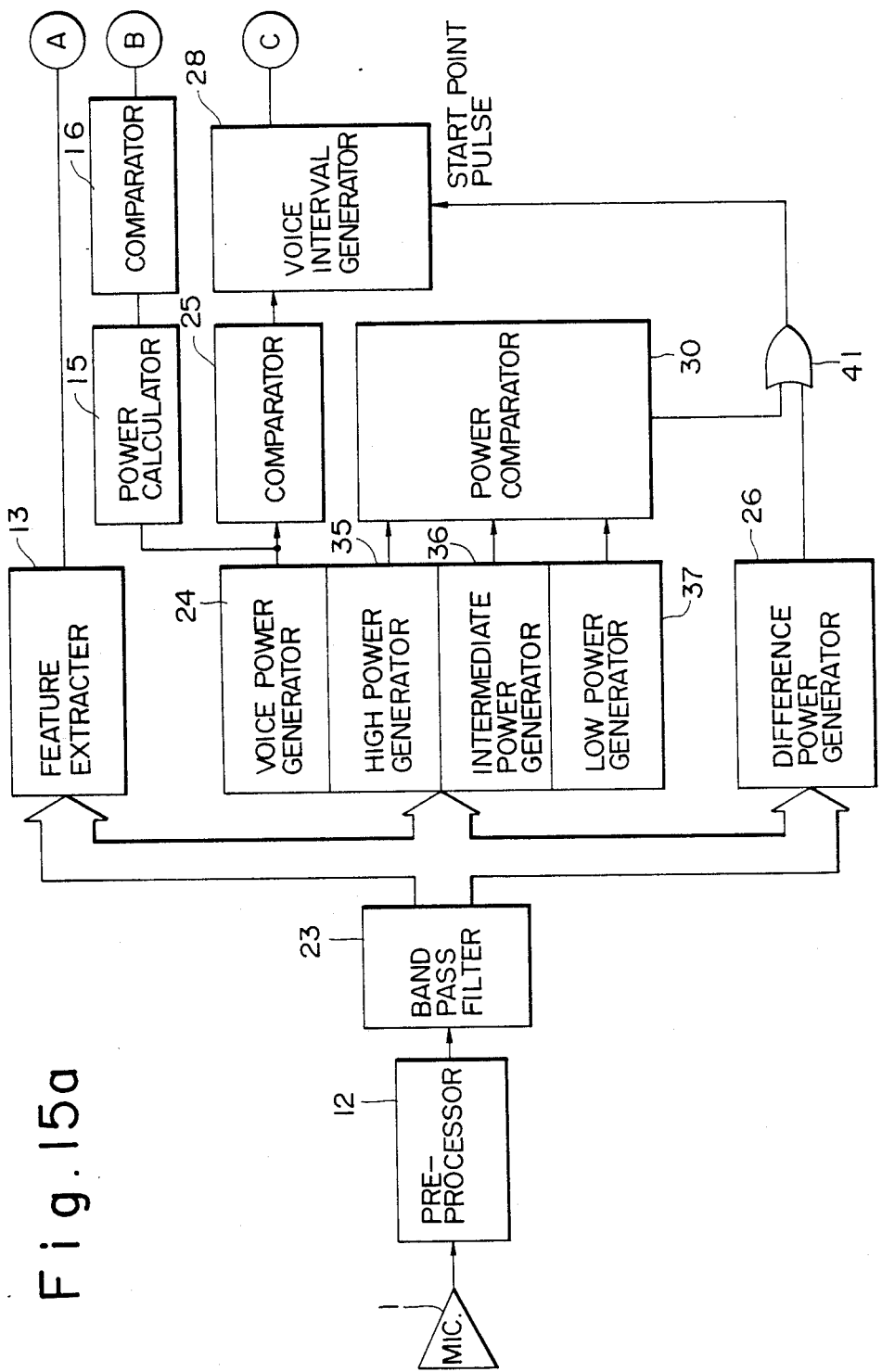
Figure 16A:
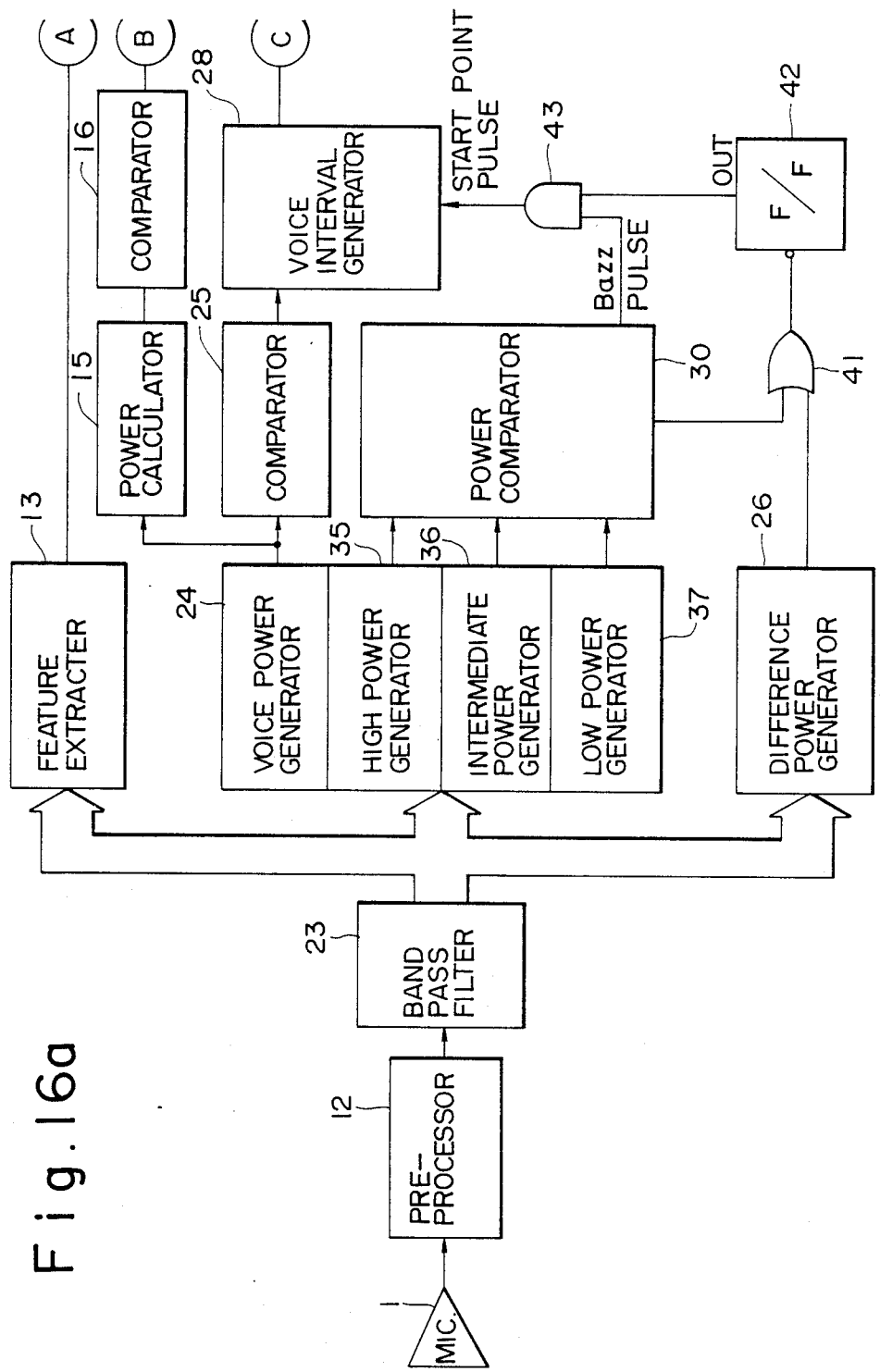

FIGS. 15a and 15b combined as shown in FIG. 15 shows in block form another embodiment of the present invention which is a combination of the embodiment shown in FIG. 6 and the embodiment shown in FIG. 11. In addition, FIGS. 16a and 16b combined as shown in FIG. 16 shows in block form a further embodiment of the present invention which is a combination of the embodiment shown in FIG. 6 and the embodiment shown in FIG. 13. It may be viewed such that the embodiments shown in FIGS. 15 and 16 are constructed by adding the cancellation function shown in FIG. 6 is added to the embodiments shown in FIGS. 11 and 13, respectively.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for registering a voice pattern by superposing two or more voice patterns for the same sound a multiple of times, comprising:
    converting means for converting a sound into an electrical voice signal;
    processing means for processing said electrical voice signal in a predetermined manner to produce a voice pattern in the form a time-frequency distribution;
    detecting means for detecting a section from the beginning of said voice pattern where voice energy of said sound is equal to or less than a first predetermined value and partial voice energy of a low frequency component of said sound is equal to or larger than a second predetermined value; and
    superposing means for superposing said voice pattern onto a previously created voice pattern for the same sound after completion of said section to form a combined voice pattern.

2. The system of claim 1 wherein said section is a bass bar section of said voice pattern.

3. The system of claim 1 wherein said converting means includes a microphone.

4. The system of claim 1 wherein said processing means includes a frequency analyzer provided with a plurality of band-pass filters different in frequency range.

5. The system of claim 1 wherein said processing means includes a maximum value detector detecting a maximum value of said voice patter and said first predetermined value is set in a first range from 10 to 40% of said maximum value.

6. The system of claim 5 wherein said second threshold value is set in a second range from 60 to 100% of said maximum value.

7. The system of claim 6 wherein said low frequency component is set in a third range from 200 Hz to 1 kHz.

8. The system of claim 7 wherein said first, second and third ranges are set approximately at 20%, 80% and 500 Hz, respectively.

9. A system for registering a voice pattern by superposing two or more voice patterns for the same sound a multiple of times, comprising:
    converting means for converting a sound into an electrical voice signal;
    processing means for processing said electrical voice signal in a predetermined manner to produce a voice pattern in the form of a time-frequency distribution.
    detecting means for detecting a section from the beginning of said voice pattern where voice energy of said sound is equal to or less than a first predetermined value and partial voice energy of a low frequency component of said sound is equal to or larger than a second predetermined value, said detecting means cutting off said section upon detection; and
    superposing means for superposing said voice pattern onto a previously created voice pattern for the same sound to form a combined voice pattern.

10. The system of claim 9 wherein said section is a bass bar section of said voice pattern.

11. The system of claim 9 wherein said converting means includes a microphone.

12. The system of claim 9 wherein said processing means includes a frequency analyzer provided with plurality of band-pass filters different in frequency range.

13. The system of claim 9 wherein said processing means includes a maximum value detector detecting a maximum value of said voice pattern and said first predetermined value is set in a first range from 10 to 40% of said maximum value.

14. The system of claim 13 wherein said second threshold value is set in a second range from 60 to 100% of said maximum value.

15. The system of claim 14 wherein said low frequency component is set in a third range from 200 Hz to 1 kHz.

16. The system of claim 15 wherein said first, second and third ranges are set approximately at 20%, 80% and 500 Hz, respectively.

17. A voice recognizing system, comprising:
converting means for converting a voice to be recognized into an electrical voice signal;
processing means for processing said electrical voice signal in a predetermined manner to produce a voice pattern in the form of a time-frequency distribution;
detecting means for detecting a section from the beginning of said voice pattern where voice energy of said voice is equal to or less than a first predetermined value and partial voice energy of a low frequency component of said voice is equal to or larger than a second predetermined value; and
matching means for matching said voice pattern with at least one of a plurality of registered voice patterns.

18. The system of claim 17 wherein said section is a bass bar section of said voice pattern.

19. The system of claim 17 wherein said converting means includes a microphone.

20. The system of claim 17 wherein said processing means includes a frequency analyzer provided with a plurality of band-pass filters different in frequency range.

21. The system of claim 17 wherein said processing means includes a maximum value detector detecting a maximum value of said voice pattern and said first predetermined value is set in a first range from 10 to 40% of said maximum value.

22. The system of claim 21 wherein said second threshold value is set in a second range from 60 to 100% of said maximum value.

23. The system of claim 22 wherein said low frequency component is set in a third range from 200 Hz to 1 kHz.

24. The system of claim 23 wherein said first, second and third ranges are set approximately at 20%, 80% and 500 Hz, respectively.

25. A voice recognizing system, comprising:
converting means for converting a voice to be recognized into an electrical voice signal;
processing means for processing said electrical voice signal in a predetermined manner to produce a voice pattern in the form of a time-frequency distribution and also a voice power signal, said voice pattern being comprised of a collection of frames in timed sequence;
identifying means for identifying said voice pattern by matching with a plurality of registered voice patterns;
detecting means for detecting a voice interval by comparing said voice power signal with a first reference value;
adding means for adding voice powers of said voice power signal over a predetermined number of frames; and
means for comparing said added voice power with a pair of lower and upper reference values and cancelling said voice pattern if said added value is outside a range between said lower and upper reference values.

26. The system of claim 25 wherein the voice powers of said predetermined number of frames are added as long as their voice powers are equal to or higher than a second reference value.

27. The system of claim 26 wherein said second reference value and said lower and upper reference values are varied in a predetermined manner as a function of a background noise level.

28. The system of claim 25 wherein said adding means adds voice powers of said voice power signal over the entire voice interval and divides an added voice power with the total number of frames to define an average frame power, and wherein said means for comparing compares said average frame power with said pair of lower and upper reference values.

29. A system for detecting a voice interval for use in voice registration or recognition, comprising:
converting means for converting a voice into an electrical voice signal;
processing means for processing said electrical voice signal at a predetermined time interval in a predetermined manner to produce a voice pattern in the form of a time-frequency distribution frame by frame, said processing means generating a voice power of said voice pattern, a first partial voice power of a low frequency range of said voice pattern and a second partial voice power of said voice pattern; and
comparing means for comparing said first partial voice power with a predetermined threshold value and also with said second partial voice power and determining a start point of said voice interval if said first partial voice power is found to be larger than both of said predetermined threshold value and said second partial voice power.

30. The system of claim 29 wherein said converting means includes a microphone.

31. The system of claim 29 wherein said processing means includes a plurality of band-pass filters different in frequency range and wherein said said low frequency range is defined by a predetermined number of said band-pass filters at a low frequency end thereof and said high frequency range is defined by a predetermined number of said band-pass filters at a high frequency end thereof.

32. The system of claim 29 wherein said processing means also generates a third partial voice power of an intermediate frequency range between said low and high frequency ranges of said voice pattern.

33. The system of claim 29 further comprising calculating means for calculating a difference power spectrum for each frame and determining a start point of said voice interval when said difference power spectrum is found to be larger than a predetermined value and an OR gate having a first input terminal for receiving an output signal from said comparing means, a second input terminal for receiving an output signal from said calculating means and an output terminal for supplying a start point pulse indicating the start point of said voice interval.

34. A system for detecting a voice interval for use in voice registration or recognition, comprising:
converting means for converting a voice into an electrical voice signal;
processing means for processing said electrical voice signal at a predetermined time interval in a predetermined manner to produce a voice pattern in the form of a time-frequency distribution frame by frame, said processing means generating a voice power of said voice pattern, a first partial voice power of a low frequency range of said voice pattern and a second partial voice power of said voice pattern; and comparing mean for comparing said second partial voice power with a predetermined threshold value and also with said first partial voice power and determining a start point of said voice interval if said second partial voice power is found to be larger than both of said predetermined threshold value and said second partial voice power.

35. The system of claim 34 wherein said converting means includes a microphone.

36. The system of claim 34 wherein said processing means includes a plurality of band-pass filters different in frequency range and wherein said said low frequency range is defined by a predetermined number of said band-pass filters at a low frequency end thereof and said high frequency range is defined by a predetermined number of said band-pass filters at a high frequency end thereof.

37. The system of claim 34 wherein said processing means also generates a third partial voice power of an intermediate frequency range between said low and high frequency ranges of said voice pattern.

38. The system of claim 37 further comprising inhibiting means for inhibiting said start point signal when said comparing means finds that said second partial voice power is larger than said first and third partial voice powers, but is smaller than a predetermined threshold value.

39. The system of claim 38 wherein said inhibiting means includes an AND gate having a first input terminal for receiving an inhibit signal from said comparing means, a second input terminal for receiving said start point signal, and an output terminal for supplying a start point pulse.

40. The system of claim 34 further comprising calculating means for calculating a difference power spectrum for each frame and determining a start point of said voice interval when said difference power spectrum is found to be larger than a predetermined value and an OR gate having a first input terminal for receiving an output signal from said comparing means, a second input terminal for receiving an output signal from said calculating means and an output terminal for supplying a start point pulse indicating the start point of said voice interval.

* * * * *